US008401569B1

(12) United States Patent
Bell et al.

(10) Patent No.: US 8,401,569 B1
(45) Date of Patent: Mar. 19, 2013

(54) SYSTEM EFFECTIVE TO DEMODULATE A MODULATED CODE AND PROVIDE CONTENT TO A USER

(75) Inventors: Alex Bell, New York, NY (US); Jonathan Glanz, New York, NY (US)

(73) Assignee: Sonic Notify, Inc., New York, NY (US)

( * ) Notice: Subject to any disclaimer, the term of this patent is extended or adjusted under 35 U.S.C. 154(b) by 0 days.

(21) Appl. No.: 13/286,670

(22) Filed: Nov. 1, 2011

Related U.S. Application Data

(60) Provisional application No. 61/538,370, filed on Sep. 23, 2011, provisional application No. 61/538,395, filed on Sep. 23, 2011, provisional application No. 61/538,443, filed on Sep. 23, 2011.

(51) Int. Cl.
*H04W 24/00* (2006.01)
*H04B 1/06* (2006.01)
*G06Q 30/00* (2012.01)

(52) U.S. Cl. .................. 455/456.3; 367/135; 705/14.58; 705/14.64

(58) Field of Classification Search ................ 455/456.3, 455/500, 334, 337, 7, 11.1; 367/135, 137; 705/14.4, 14.49, 14.58, 14.64, 14.67
See application file for complete search history.

(56) References Cited

U.S. PATENT DOCUMENTS

| 2011/0320259 A1* | 12/2011 | Roumeliotis et al. ...... 705/14.41 |
| 2012/0051187 A1* | 3/2012 | Paulson ........................ 367/135 |

* cited by examiner

*Primary Examiner* — Nguyen Vo
(74) *Attorney, Agent, or Firm* — Steven S. Rubin, Esq.

(57) ABSTRACT

A system and method effective to provide content to a user. The system may include a sound device, a smart phone, and a processor. The sound device may produce a modulated code where different frequencies represent respectively logic 0s and 1s. The smart phone may apply a transform and peak detector to the modulated code to determine logic 0s and 1s to demodulate the code. The smart phone may send the demodulated code to a processor. The processor may receive the code, determine content associated with the code, and send the content over the network to the smart phone. The smart phone may further receive the content and output the content on a display.

20 Claims, 3 Drawing Sheets

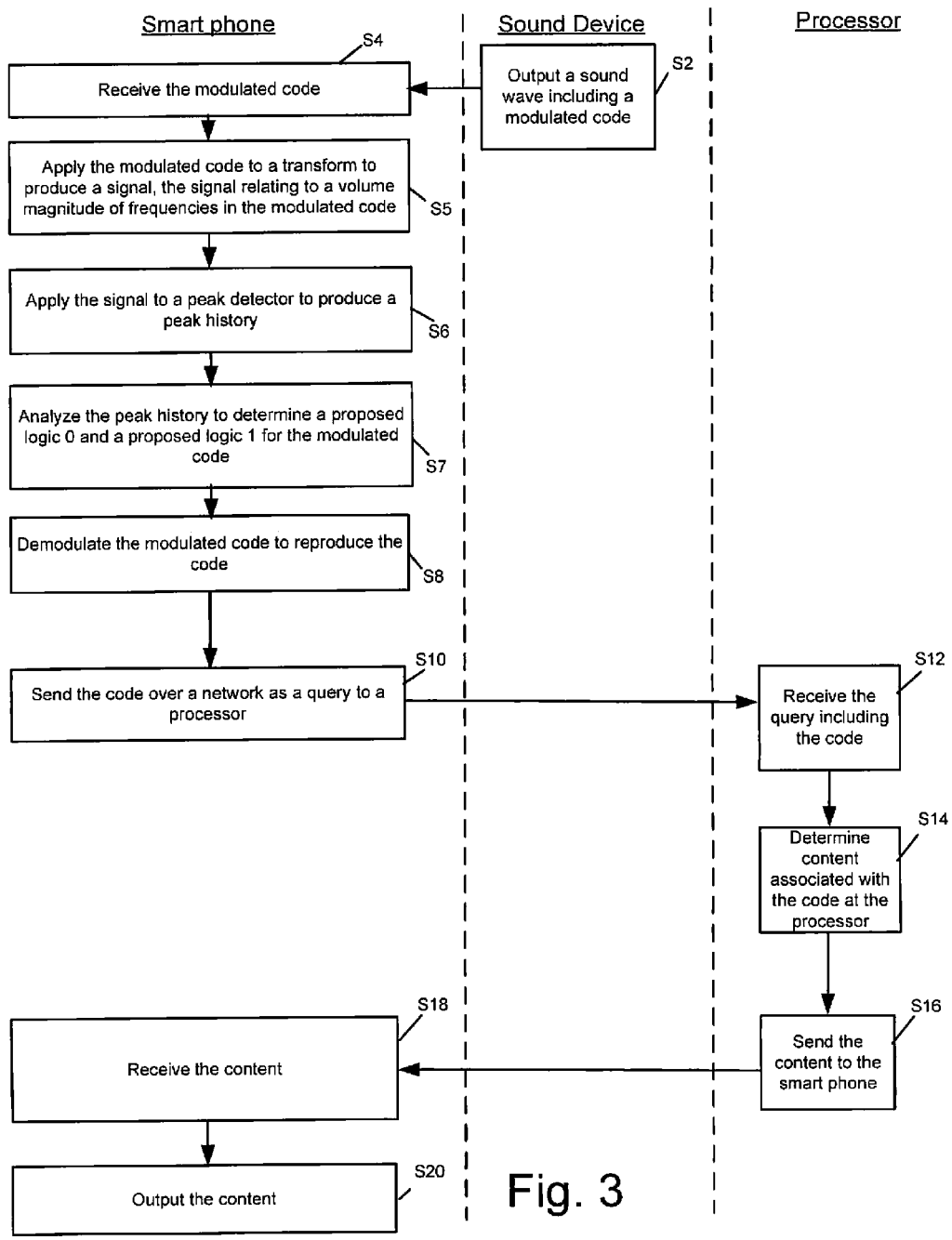

SYSTEM EFFECTIVE TO DEMODULATE A MODULATED CODE AND PROVIDE CONTENT TO A USER

CROSS-REFERENCE TO RELATED APPLICATIONS

The present application claims priority to provisional application No. 61/538,370 entitled "SYSTEM EFFECTIVE TO ENCODE A SIGNAL AND PROVIDE CONTENT TO A USER" filed Sep. 23, 2011 naming Alex Bell and Jonathan Glanz as inventors, and claims priority to provisional application No. 61/538,395 entitled "SYSTEM EFFECTIVE TO DECODE A SIGNAL AND PROVIDE CONTENT TO A USER" filed Sep. 23, 2011 naming Alex Bell and Jonathan Glanz as inventors, and to provisional application No. 61/538,443 entitled "DEVICE EFFECTIVE TO ENCODE A SIGNAL AND TO PROVIDE CONTENT TO A USER" filed Sep. 23, 2011 naming Alex Bell and Jonathan Glanz as inventors, the entirety of these three applications is hereby incorporated by reference in their entirety.

BACKGROUND OF THE INVENTION

1. Field of the Invention

This disclosure relates to a system and method effective to provide targeted content to a potential user in sound communication with a sound device.

2. Description of the Related Art

A smart phone may include devices and structures capable of communicating over a cellular or satellite network. Smart phones may also be capable of storing an application capable of utilizing some of the data available to the smart phone. For example, the application may be able to combine a user's contact list and location to generate additional content for the user.

SUMMARY OF THE INVENTION

One embodiment of the invention is a system effective to provide content to a user. The system may comprise a sound device effective to output a sound wave including a modulated code. The system may comprise a smart phone in communication with the sound device. The smart phone may be effective to receive the modulated code, and apply the modulated code to a transform to produce a signal, the signal relating to a volume magnitude of frequencies in the modulated code. The smart phone may be effective to apply the signal to a peak detector to produce a peak history, and analyze the peak history to determine a proposed logic 0 and a proposed logic 1 for the modulated code. The smart phone may be effective to demodulate the modulated code with the proposed logic 0 and proposed logic 1 to reproduce the code, and send the code over a network as a query to a processor. The processor may be effective to receive the query including the code, determine content associated with the code, and send the content to the smart phone. The smart phone may be further effective to receive the content and output the content.

Another embodiment of the invention is a method for providing content to a user. The method may comprise outputting, by a sound device, a sound wave including a modulated code. The method may further comprise receiving, by a smart phone, the modulated code. The method may further comprise applying, by the smart phone, the modulated code to a transform to produce a signal, the signal relating to a volume magnitude of frequencies in the modulated code. The method may further comprise applying, by the smart phone, the signal to a peak detector to produce a peak history. The method may further comprise analyzing, by the smart phone, the peak history to determine a proposed logic 0 and a proposed logic 1 for the modulated code. The method may further comprise demodulating, by the smart phone, the modulated code using the proposed logic 0 and proposed logic 1 to reproduce the code. The method may further comprise sending, by the smart phone, the code over a network as a query to a processor. The method may further comprise receiving, by the processor, the query including the code. The method may further comprise determining, by the processor, content associated with the code. The method may further comprise sending, by the processor, the content to the smart phone. The method may further comprise receiving the content by the smart phone. The method may further comprise outputting the content by the smart phone.

Yet another embodiment of the invention is a smart phone effective to provide content to a user. The smart phone may comprise a microphone, a memory, an application stored in the memory, and a first processor in communication with the microphone and the memory. The microphone may be effective to receive a sound wave including a modulated code. The first processor may be effective to receive the modulated code and, in response to instructions from the application apply the modulated code to a transform to produce a signal, the signal relating to a volume magnitude of frequencies in the modulated code. The first processor may be further effective to apply the signal to a peak detector to produce a peak history. The first processor may be further effective to analyze the peak history to determine a proposed logic 0 and a proposed logic 1 for the modulated code. The first processor may be further effective to demodulate the modulated code with the proposed logic 0 and proposed logic 1 to reproduce the code. The first processor may be further effective to send the code over a network as a query to a second processor. The first processor may be further effective to receive content from the second processor in response to the query. The first processor may be further effective to output the content.

BRIEF DESCRIPTION OF THE FIGURES

The foregoing and other features of this disclosure will become more fully apparent from the following description and appended claims taken in conjunction with the accompanying drawings. Understanding that these drawings depict only some embodiments in accordance with the disclosure and are therefore not to be considered limiting of its scope, the disclosure will be described with additional specificity and detail by reference to the accompanying drawings in which:

FIG. 3 is a flow chart illustrating a process that may be performed in accordance with an embodiment of the invention.

DETAILED DESCRIPTION OF THE PREFERRED EMBODIMENT(S)

Figure 1:
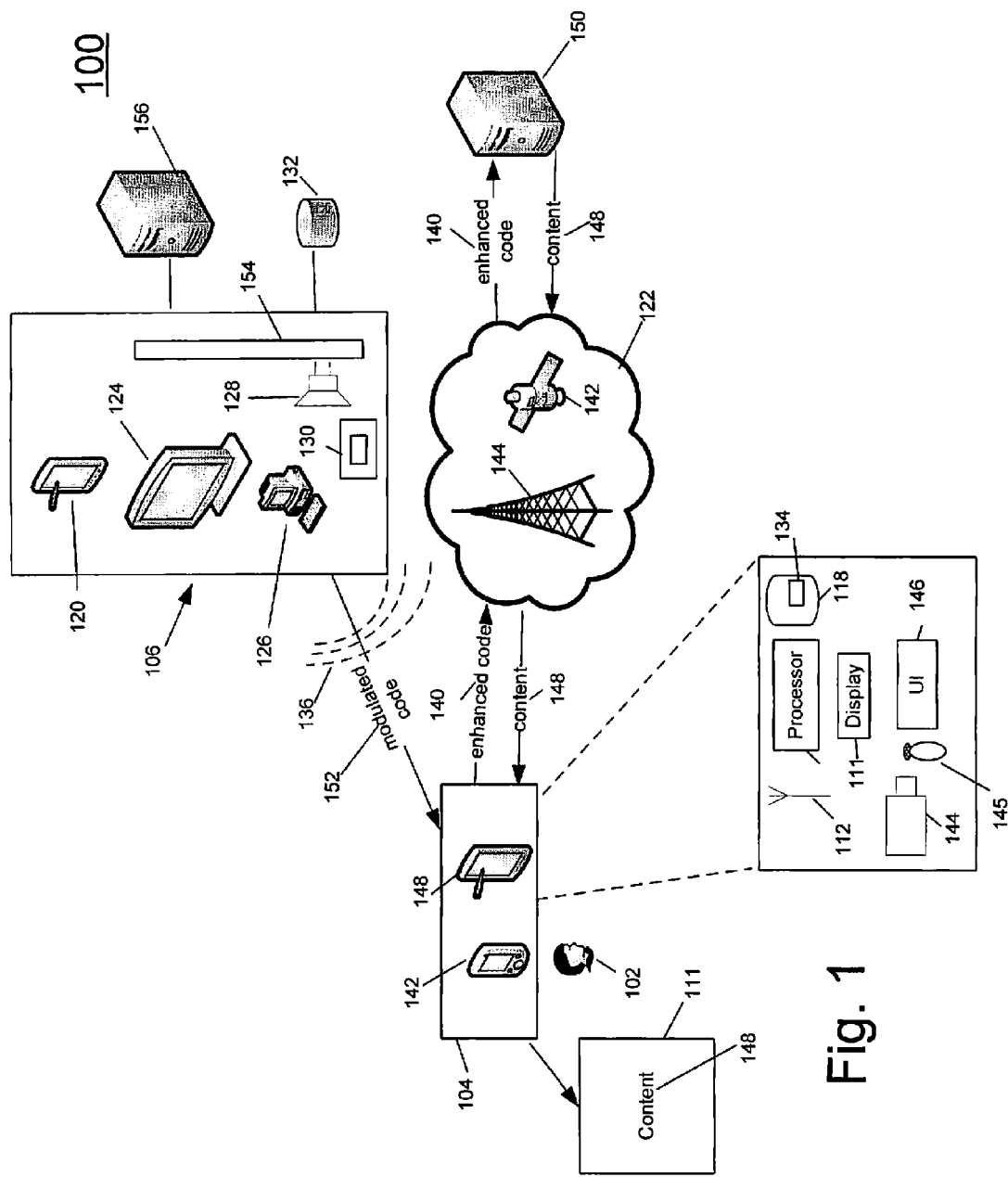
FIG. 1 is a system drawing of a system effective to decode a signal and provide content to a user in accordance with an embodiment of the invention.

In the following detailed description, reference is made to the accompanying drawings which form a part thereof. In the drawings, similar symbols typically identify similar components unless context indicates otherwise. The illustrative embodiments described in the detailed description, drawings and claims are not meant to be limiting. Other embodiments may be utilized and other changes may be made without departing from the spirit or scope of the subject matter presented herein. It will be readily understood that the aspects of the present disclosure as generally described herein and as illustrated in the accompanying figures can be arranged, substituted, combined, separated and/or designed in a wide variety of different configurations all of which are explicitly contemplated herein.

Referring to FIG. 1, there is shown a system 100 in accordance with an embodiment of the invention. In summary, a smart phone 104 may be configured to receive audio waves 136 output by a sound device 106. Waves 136 may be frequency modulated to modulate a binary code 138. Smart phone 104 may demodulate code 138 from modulated code 152 sent in waves 136 to reproduce code 138. Smart phone 104 may send an enhanced code 140 across a network 116 as a query to a processor 150. In response to a query including enhanced code 140, processor 150 may send content 148 to smart phone 104 to be output by smart phone 104. User 102 may be informed of receipt of content 148 such as through a vibration of smart phone 104. Content 148 may be anything that can be outputted by a smart phone such as a coupon, audio, video, audio-video, digital piece of content, movie, web page, a pointer to content, etc.

Smart phone 104 may include an antenna 112, a display 116, a memory 118, a user interface 146, a microphone 145 and a camera 144 all in communication with a processor 113. Antenna 112 may enable wireless communications with a cellular base station 144 or satellite 142 in network 122. Memory 118 may store an application 134 effective to provide instructions for processor 113.

Sound device 106 may be any device capable of outputting sound waves. For example, sound device 106 may be a smart phone 120, a television 124, a computer 126, a badge 130 such as a participant may wear in a conference, a speaker 128 such as a beacon, etc. In examples where sound device 106 is a beacon 128, beacon 128 could be placed on, for example, a shelf 154 in a store. Speaker 128 could also be a speaker effective to output sound waves audible by a human such as in a public address system. Sound device 106 may include and/or be in communication with a processor 156 and a memory 132 that may include code 138. Sound device 106 may be configured to adjust a volume magnitude of sound waves 136 based on desired distance between sound device 106 and a potential user 102 using smart phone 104. Based on a volume magnitude of sound waves 136 a range may be defined including locations where smart phone 104 has difficulty demodulating modulated code 152, and locations where smart phone 104 can demodulate modulated code 152.

The inventors have discovered that, as many different types of devices may be used for sound device 106, many different ranges of frequencies may be used to modulate code 138 on to sound waves 126 making demodulation of modulated code 152 complex. Further, an environment around sound device 106 may be noisy. Code 138 may be a binary code comprised of logic 0s and logic 1s. Sound device 106 may be configured, such as through processor 156, to modulate and output modulated code 152 by assignment of a first range of frequencies for a logic "0" and assignment of a second range of frequencies for a logic "1". This allows modulated code 152 to be output from a plurality of distinct sound devices 106 which may have different speaker resolution outputs.

For example, a logic "0" may be assigned to sound pulses in wave 136 with a frequency in the range between about 20,550 Hz and about 21,000 Hz. Similarly, a logic "1" may be assigned to sound pulses with a frequency in the range from about 21,000 Hz to about 22,000 Hz. Each sound pulse may be, for example, about 1 ms in duration. Sound device 106 may thus be able to generate modulated code 152, including a series of logic 0s and 1s, by outputting sound pulses in a first range of frequencies, and a second range of frequencies, respectively. The entire modulated code 152 may last about 32 ms long and may include 32 logic bits. Modulated code 152 may be repeatedly and periodically output by sound device 106. In an example, a clock pulse may be output in between each sound pulse. For example, the clock pulse may be in a third set of frequencies, such as that centered in between the first and second ranges of frequencies. In the example, the clock pulse may be at 21,000 Hz. The clock pulse may be used to denote the beginning of a new bit.

Smart phone 104 may be configured to listen for sound waves 136 in a variety of methods. In some examples, these methods may include passive activation techniques. For example, on owner of application 134 may provide application 134 with a time when sound waves 136 will be output by sound device 106. For example, application 134 may be related to a particular brand and the company that owns the brand may plan to output waves 136 at a designated time interval. In the example, company X may seek to output waves 136 relating to brand Y at a particular time.

Application 134 may then wake up the operating system of smart phone and control processor 113 to listen for modulated code 140 at the time interval. For example, television 124 may output an advertisement audible to a human. During or after the advertisement, television 124 may output sound waves 136 with modulated code 152 that will result in server 150 outputting further content 148 relating to the advertisement. In this way, advertisements to potential users may be targeted based on time. Advertisements may also be augmented with additional information.

Figure 2:
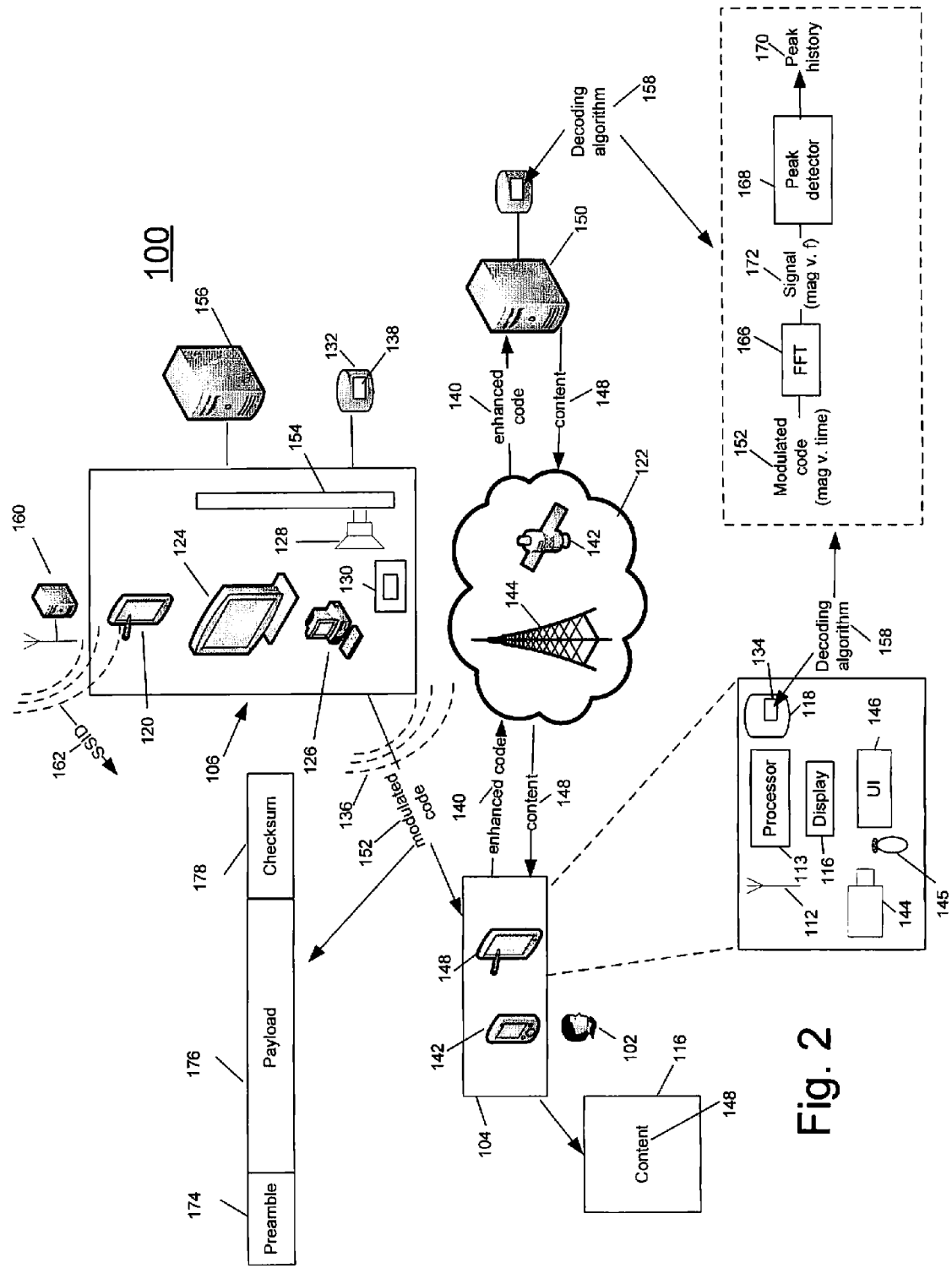
FIG. 2 is a system drawing of a system effective to decode a signal and provide content to a user in accordance with an embodiment of the invention.

As shown in FIG. 2, in another example, a WIFI router 160 may be used to broadcast an SSID (service set identifier) 162. Application 134 may control processor 113 of smart phone 104 to listen for particular SSID values associated with an owner of application 134—such as SSID values related to brands owned by the same company that owns application 134. After smart phone 102 receives SSID 162, application 134 wakes up an operating system of smart phone 102 and controls processor 113 to listen for modulated code 152. A user 102 may tailor preferences in application 134 so that application 134 can only wake up the operating system of smart phone 134 when processor 113 determines that smart phone 134 is within a defined geographic area. Similarly, application 134 may limit the SSIDs that may wake up smart phone 104. Application 134 may also limit the codes capable of being demodulated by smart phone 104 to limit the types of content 150 that may be requested by smart phone 104.

Modulated code 152 may come from a variety of distinct sound devices 106 with different speaker capabilities and resolutions. Moreover, an environment around sound device 106 may be noisy. A decoding algorithm 158 may be implemented by application 134 or processor 150 to demodulate code 138 from modulated code 152. In examples where processor 150 performs the demodulating, enhanced code 140 may include modulated code 152 plus any additional context information as discussed herein.

As shown in FIG. 2, decoding algorithm 158 may be configured to apply modulated code 152 to a FFT (fast Fourier transform) module 166 to produce a signal 172 including volume magnitudes of frequencies in frequency ranges in modulated code 152. Decoding algorithm 158 may apply signal 172 to a peak detector module 168 to produce a peak history 170. Peak detector module 168 may, for example, detect volume magnitude values in signal 172 where a polarity of a derivative of the value with respect to frequency changes on either side of the value. Modules may be implemented using hardware or software.

Each bit in modulated code 152 may be output for a time step length of time, such as 1 ms. Modulated code 152 may then be the total number of bits (e.g. 32) multiplied by the time step. Peak history 170 may be for example, 100 ms long corresponding to the length of one or more repetitions of modulated code 152. Peak history 170 may include an indication of frequencies with volume magnitudes above a threshold magnitude value designated by peak detector module 168. Such peaks may include logic 0s and 1s in modulated code 152, and may also include noise such as someone rubbing a microphone or sneezing, or other loud sounds, etc.

Decoding algorithm 158 may then analyze peak history 170 and determine the number of occurrences of peaks for each frequency range. If more than a threshold number of peaks occurred within a particular frequency range it is likely that the particular frequency range includes a logic 0 or 1 and not noise. An example frequency range may be an increment of 100 hz.

Decoding algorithm 158 may then determine a first and a second set of frequencies with the greatest number of peaks in peak history 170. Decoding algorithm may assign a logic value of 0 to the set of frequencies with the lower frequency values and assign a logic value 1 to the set of frequencies with the higher frequency values. For example, if 30 peaks occurred at frequencies centered around 20,500 Hz, 8 peaks occurred at frequencies centered around 20,400 Hz, and less than 8 peaks occurred centered around other frequencies, it is likely that frequencies centered around 20,500 Hz and 20,400 Hz respectively, were used to modulate for logic 0s and 1s. Decoding algorithm 158 may then analyze modulated code 152 and assign each occurrence of a frequency in the first set of frequencies as a logic value of 0 and each occurrence of a frequency in the second frequencies as a logic value of 1 to produce a proposed demodulated code.

Modulated code 152 may include a preamble 174, a payload 176 including code 138, and a checksum 178. Decoding algorithm may apply checksum 178 to the same modules above to determine a proposed checksum. Decoding algorithm 158 may compare the proposed demodulated code with a proposed checksum. If the proposed checksum corresponding to the logic 0s and the proposed checksum corresponding to the logic 1s match the proposed demodulated code, then decoding algorithm 158 has successfully reproduced code 138 from modulated code 152. If the proposed checksum corresponding to the logic 0s and the proposed checksum corresponding to the logic 1s do not match the proposed demodulated code, decoding algorithm 158 may iterate through modulated code 152 and assign logic 0 and logic 1 to different sets of frequencies.

Sound waves 136 may be received by microphone 145 of smart phone 104 and processed by processor 113 using instructions in application 134. Processor 113 may demodulate modulated code 152 to reproduce code 138. Processor 113 may then add additional context data to code 138 relating to smart phone 104 to produce enhanced code 140. For example, processor 113 may add information relating to an owner of application stored on smart phone 104 such as an indication of a particular brand, mark, or company. For example, application 134 may be owned by company X and may be used to promote sale of products relating to product X. Enhanced code 140 may include information regarding a location of smart phone 104 and/or a location of sound device 106. Enhanced code 140 may include an identifier of smart phone 104 so that, upon receipt of enhanced code 140, processor 150 may not repeatedly send content 148 to smart phone 104.

As mentioned above, enhanced code 140 may be sent over network 116 as a query to processor 150. In response to enhanced code 140, processor 150 may send content 148 over network 116 to smart phone 104 for output on display 116.

In an example, beacon 128 may sit on shelf 154 and output waves 136 including code 138 relating to brand X. Smart phone 104 may receive waves 136, demodulate code 138 and generate enhanced code 140. Processor 150 may receive enhanced 140 and send content 148 to smart phone 104 relating to brand X. For example, content 148 may include a coupon relating to brand X.

Among other benefits, an advertiser using a system in accordance with this disclosure may be able to inexpensively reach a user's smart phone when the user is in sound communication with a real world place or when the user is experiencing media. Expensive hardware need not be used as in other devices that require processors and feedback loops to ensure that a particular frequency is emitted—as in situations where the particular value of the frequency is used as a query. A potential user's smart phone may be targeted at a particular location such as in an aisle in a store. In another example, a conference participant may wear an inexpensive, disposable badge with a beacon effective to output a sound wave with a modulated code. The code may result in content 148 indicating that a person (with the badge) is in close proximity of the smart phone and may further provide information about the person wearing the badge. A television commercial can output a code inaudible to humans in conjunction with an audible commercial.

Referring to FIG. 3, there is shown a process which may be performed in accordance with an embodiment of the invention. The process could be implemented using, for example, system 100 discussed above with respect to FIGS. 1 and 2. As shown, at a step S2, a sound device may be effective to output a modulated code.

At step S4, a smart phone may receive the modulated code. At step S5, the smart phone may apply the modulated code to a transform to produce a signal, the signal relating to a volume magnitude of frequencies in the modulated code. At step S6, the smart phone may apply the signal to a peak detector to produce a peak history. At step S7, the smart phone may analyze the peak history to determine a proposed logic 0 and a proposed logic 1 for the modulated code. At step S8, the smart phone may demodulate the modulated code to reproduce the code. At step S10, the smart phone may send the code over a network as a query to a processor.

At step S12, the processor may receive the query including the code from the smart phone. At step S14, the processor may determine content associated with the code. At step S16, the processor may send the content to the smart phone.

At step S18, the smart phone may receive the content. At step S20, the smart phone may output the content.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system effective to provide content to a user, the system comprising:
   a sound device effective to output a sound wave including a modulated code;

a smart phone in communication with the sound device, the
   smart phone effective to
   receive the modulated code,
   apply the modulated code to a transform to produce a
      signal, the signal relating to a volume magnitude of
      frequencies in the modulated code,
   apply the signal to a peak detector to produce a peak
      history,
   analyze the peak history to determine a proposed logic 0
      and a proposed logic 1 for the modulated code,
   demodulate the modulated code with the proposed logic
      0 and proposed logic 1 to reproduce the code, and
   send the code over a network as a query to a processor;
the processor effective to
   receive the query including the code,
   determine content associated with the code, and
   send the content to the smart phone; and
the smart phone further effective to receive the content and
   output the content.

2. The system as recited in claim 1, wherein:
the smart phone includes an operating system, a memory
   and an application stored in the memory; and
the application is effective to wake up the operating system
   and control the processor to listen for the modulated
   code at a designated time interval.

3. The system as recited in claim 1, wherein the sound
device is further effective to output another sound wave
audible to a human.

4. The system as recited in claim 1, wherein:
the smart phone includes an operating system, a memory
   and an application stored in the memory;
the smart phone is effective to receive a service set identifier; and
the application is effective to wake up the operating system
   and control the processor to listen for the modulated
   code after receipt of the service set identifier.

5. The system as recited in claim 1, wherein:
the smart phone includes an operating system, a memory
   and an application stored in the memory;
the smart phone is effective to receive a service set identifier; and
the application is effective to wake up the operating system
   and control the processor to listen for the modulated
   code after receipt of the service set identifier and after a
   determination by the processor that the smart phone is in
   a defined geographic area.

6. The system as recited in claim 1, wherein the smart
phone is effective to apply the modulated code to a fast
Fourier transform module to produce the signal.

7. The system as recited in claim 6, wherein the peak
history includes an indication of frequencies with volume
magnitudes above a threshold.

8. The system as recited in claim 7, wherein the smart
phone is effective to analyze the peak history to
   determine a first set of frequencies and a second set of
      frequencies with the greatest number of volume magnitude peaks in the peak history respectively, where the
      first set of frequencies has a lower frequency range than
      the second set of frequencies;
   assign a logic 0 to the first set; and
   assign a logic 1 to the second set.

9. The system as recited in claim 8, wherein:
the modulated code includes a payload; and
the smart phone is further effective to
   assign the logic 0 to the first set of frequencies in the
      payload and assign the logic 1 to the second set frequencies in the payload to determine a proposed payload.

10. The system as recited in claim 9, wherein:
the modulated code includes a checksum; and
the smart phone is further effective to
   assign the logic 0 to the first set of frequencies in the
      checksum and assign the logic 1 to the second set
      frequencies in the checksum to determine a proposed
      checksum; and
   compare the proposed payload with the proposed checksum to determine whether the proposed payload
      matches the proposed checksum.

11. The system as recited in claim 10, wherein:
when the proposed payload does not match the proposed
   checksum, the smart phone is effective to
assign a logic 0 to a third set of frequencies; and
assign a logic 1 to a fourth set of frequencies.

12. A method for providing content to a user, the method
comprising:
   outputting, by a sound device, a sound wave including a
      modulated code;
   receiving, by a smart phone, the modulated code;
   applying, by the smart phone, the modulated code to a
      transform to produce a signal, the signal relating to a
      volume magnitude of frequencies in the modulated
      code;
   applying, by the smart phone, the signal to a peak detector
      to produce a peak history;
   analyzing, by the smart phone, the peak history to determine a proposed logic 0 and a proposed logic 1 for the
      modulated code;
   demodulating, by the smart phone, the modulated code
      using the proposed logic 0 and proposed logic 1 to reproduce the code;
   sending, by the smart phone, the code over a network as a
      query to a processor;
   receiving, by the processor, the query including the code;
   determining, by the processor, content associated with the
      code;
   sending, by the processor, the content to the smart phone;
   receiving the content by the smart phone; and
   outputting the content by the smart phone.

13. The method as recited in claim 12, further comprising
waking up an operating system of the smart phone to listen for
the modulated code at a designated time interval.

14. The method as recited in claim 12, further comprising:
   receiving a service set identifier by the smart phone; and
   waking up an operating system of the smart phone and
      listening for the modulated code after receiving the service set identifier.

15. The method as recited in claim 12, further comprising:
   applying the modulated code to a fast Fourier transform
      module to produce the signal; and wherein
   the peak history includes an indication of frequencies with
      volume magnitudes above a threshold.

16. The method as recited in claim 15, wherein analyzing
the peak history includes:
   determining a first set of frequencies and a second set of
      frequencies with the greatest number of volume magnitude peaks in the peak history respectively, where the
      first set of frequencies has a lower frequency range than
      the second set of frequencies;
   assigning a logic 0 to the first set; and
   assigning a logic 1 to the second set.

17. The method as recited in claim 16, wherein:
the modulated code includes a payload and a checksum;
and the method further comprises
- assigning the logic 0 to the first set of frequencies in the payload and assigning the logic 1 to the second set frequencies in the payload to determine a proposed payload;
- assigning the logic 0 to the first set of frequencies in the checksum and assigning the logic 1 to the second set frequencies in the checksum to determine a proposed checksum; and
- comparing the proposed payload with the proposed checksum to determine whether the proposed payload matches the proposed checksum.

18. The method as recited in claim 17, wherein:
when the proposed payload does not match the proposed checksum, the method further comprises
assigning a logic 0 to a third set of frequencies; and
assigning a logic 1 to a fourth set of frequencies.

19. A smart phone effective to provide content to a user, the smart phone comprising:
- a microphone;
- a memory;
- an application stored in the memory; and
- a first processor in communication with the microphone and the memory; wherein
- the microphone is effective to receive a sound wave including a modulated code;
- the first processor is effective to receive the modulated code and, in response to instructions from the application
  - apply the modulated code to a transform to produce a signal, the signal relating to a volume magnitude of frequencies in the modulated code,
  - apply the signal to a peak detector to produce a peak history,
  - analyze the peak history to determine a proposed logic 0 and a proposed logic 1 for the modulated code,
  - demodulate the modulated code with the proposed logic 0 and proposed logic 1 to reproduce the code,
  - send the code over a network as a query to a second processor,
  - receive content from the second processor in response to the query; and
  - output the content.

20. The smart phone as recited in claim 19, wherein:
the smart phone includes an operating system, a memory and an application stored in the memory;
the modulated code includes a payload and a checksum;
the peak history includes an indication of frequencies with volume magnitudes above a threshold;
and the processor is effective to
- apply the modulated code to a fast Fourier transform module to produce the signal;
- analyze the peak history to determine a first set of frequencies and a second set of frequencies with the greatest number of peaks in the peak history respectively, where the first set of frequencies has a lower frequency range than the second set frequencies;
- assign the logic 0 to the first set of frequencies in the payload and assign the logic 1 to the second set frequencies in the payload to determine a proposed payload;
- assign the logic 0 to the first set of frequencies in the checksum and assign the logic 1 to the second set frequencies in the checksum to determine a proposed checksum; and
- compare the proposed payload with the proposed checksum to determine whether the proposed payload matches the proposed checksum.

* * * * *